United States Patent [19]

Braswell

[11] Patent Number: 5,201,830
[45] Date of Patent: Apr. 13, 1993

[54] SYSTEM FOR CONTROLLING AMBIENT PRESSURE WITHIN AN ENCLOSED ENVIRONMENT

[76] Inventor: Marion M. Braswell, 26 Hellberg Ave., Chalfont, Pa. 18914

[21] Appl. No.: 493,994

[22] Filed: Mar. 15, 1990

[51] Int. Cl.5 .............................................. B64D 13/00
[52] U.S. Cl. .................................. 244/118.5; 244/129.5
[58] Field of Search ................. 244/118.5, 140, 129.5; 340/531, 626, 945, 963; 73/802; 98/1.5

[56] References Cited

U.S. PATENT DOCUMENTS

| | | | |
|---|---|---|---|
| 2,428,283 | 9/1947 | Kemper | 98/1.5 |
| 2,515,639 | 7/1950 | Draney | 244/118 |
| 2,679,467 | 5/1954 | Sherts | 154/2.73 |
| 3,259,892 | 7/1966 | Winckelmann | 340/626 |
| 3,268,867 | 8/1966 | Pickett et al. | 340/626 |
| 3,272,608 | 9/1966 | Andresen | 98/1.5 |
| 3,364,837 | 1/1968 | Schooling | 98/1.5 |
| 3,373,675 | 3/1968 | Best | 98/1.5 |
| 3,375,771 | 4/1968 | Balcom, Jr. | 98/1.5 |
| 3,376,803 | 4/1968 | Emmons | 98/1.5 |
| 3,577,902 | 5/1971 | Gardner | 98/1.5 |
| 3,596,269 | 7/1971 | Laska | 244/129.1 |
| 3,703,139 | 11/1972 | Furlong | 98/1.5 |
| 3,828,333 | 8/1974 | Bryant | 340/626 |
| 3,938,764 | 2/1976 | McIntyre et al. | 244/129.1 |
| 3,985,318 | 10/1976 | Dominey et al. | 340/626 |
| 4,160,600 | 7/1979 | Luke | 73/705 |
| 4,164,896 | 8/1979 | Aldrich | 98/1.5 |
| 4,164,900 | 8/1979 | Aldrich | 98/1.5 |
| 4,351,501 | 9/1982 | Peash | 244/129.1 |
| 4,383,666 | 5/1983 | Allerding et al. | 244/118.5 |
| 4,390,152 | 6/1983 | Jorgensen | 244/118.5 |
| 4,432,514 | 2/1984 | Brandon | 244/118.5 |
| 4,494,106 | 1/1985 | Smith et al. | 340/626 |
| 4,517,834 | 5/1985 | Luke | 73/146.5 |
| 4,523,186 | 6/1985 | Fiarman | 340/566 |
| 4,553,474 | 11/1985 | Wong et al. | 98/1.5 |
| 4,620,093 | 10/1986 | Barkhoudarian et al. | 250/227.21 |
| 4,692,610 | 9/1987 | Szuchy | 73/802 |
| 4,808,814 | 2/1989 | Hofer et al. | 250/227.15 |
| 4,960,249 | 10/1990 | Signoret et al. | 244/118.5 |

OTHER PUBLICATIONS

Planning ODR Purchases, Feb. 1988, pp. 103, 105, 106, 108 & 110.
Fiber Optic Trends, Dec. 1988, 4 pages, by John F. Wahl.
Producing Optical Fiber, 3 pages, by Scott A. Esty.

*Primary Examiner*—Joseph F. Peters, Jr.
*Assistant Examiner*—Anne E. Bidwell

[57] ABSTRACT

The present invention provides a system for controlling ambient pressure within an enclosed environment. The system is comprised of means for outputting a first signal, generally of a predetermined value. That signal is received in a detecting and comparing means which determines the relative change in the signal over time. Based upon the determination of the signal change, a second signal is generated. The second signal is received by an active device which is capable of altering the ambient pressure within the enclosed environment and responds to the second signal.

1 Claim, 4 Drawing Sheets

SYSTEM FOR CONTROLLING AMBIENT PRESSURE WITHIN AN ENCLOSED ENVIRONMENT

BACKGROUND OF THE INVENTION

1. Field of the Invention

This invention generally relates to systems and devices which monitor and automatically alter the ambient pressure in an enclosed environment. This invention relates more particularly to enclosed environments in which the ambient air is pressurized. This invention relates most particularly to the pressurized environment of the type found in aircraft.

2. Description of the Prior Art

In the preferred application of pressurized aircraft, the prior art has recognized the need to control cabin pressurization. In particular, the prior art has recognized the need to control the cabin atmosphere in view of sudden depressurizations.

U.S. Pat. No. 4,390,152 sets forth one prior art example of an attempt to control cabin pressure.

U.S. Pat. No. 4,383,666 discloses an attempt to equalize pressure between the upper and lower compartments of an aircraft.

In the broader application, U.S. Pat. No. 2,679,467 discloses a device which is intended to rupture in order to relieve internal pressure within an enclosed environment.

While the prior art has recognized the desirability of controlling the pressure within an enclosed environment, it has not recognized the need to provide an active means for positively responding to the change in pressure over time.

It is an object of the present invention to provide a system which monitors ambient pressure within an enclosed environment and includes a positive means of altering the environment.

SUMMARY OF THE INVENTION

The present invention provides a system for controlling ambient pressure within an enclosed environment. The system is comprised of means for outputting a first signal, generally of a predetermined value. That signal is received in a detecting and comparing means which determines the relative change in the signal over time. Based upon the determination of the signal change, a second signal is generated. The second signal is received by an active device which is capable of altering the ambient pressure within the enclosed environment and responds to the second signal.

DESCRIPTION OF THE PREFERRED EMBODIMENT

Figure 1:
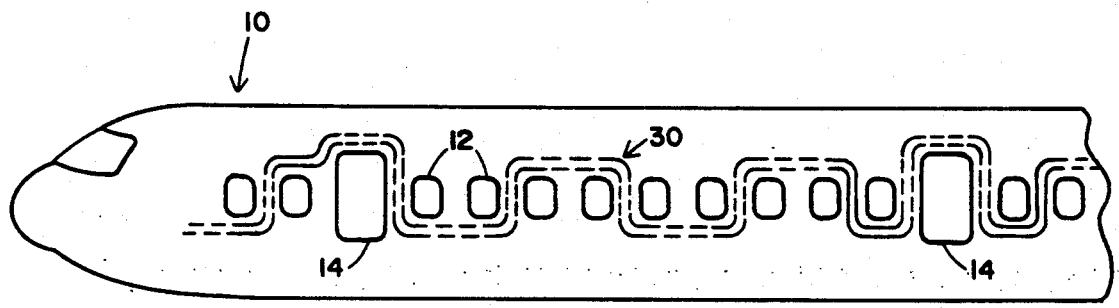
FIG. 1 is an illustrative side view of an aircraft depicting the path of the preferred fiber optic cable around the aircraft.

The preferred embodiment of the invention will be described with reference to the drawing figures and like elements will be identified by the same numeral throughout.

In the present description, the entire aircraft is assumed to be a pressurized containment area for the ease of description. References hereinafter to the enclosed area, cabin area or pressurized containment area will refer to that area of the enclosed environment where it is desirable to detect and respond to sudden pressure changes.

Recent experience indicates that the cabin integrity may be suddenly and catastrophically altered by the loss of a door, a hatch and/or by the loss of the craft's outer skin. Recent experience has also taught us that cabin failures may be precipitated by human error, metal fatigue associated with the repeated cycles of pressurizing and depressurizing the aircraft, design flaws and/or improperly designed maintenance procedures. Since any one or all of these factors is capable of creating a catastrophic loss of cabin pressure, an early warning about the potential for failure or the occurrence of an actual failure in a pressurized containment area is imperative.

Since the system cable is routed by and around the most likely areas for a failure, the system will respond to any loss of integrity in the craft and will provide a warning. If the loss of integrity is not such as to endanger the craft, the system cable provides a means for locating the potential failure area. In the event that an actual failure, such as the loss of a door or the like, takes place, the system will immediately recognize the position of the flaw and will actively respond to control the changes.

Figure 2:
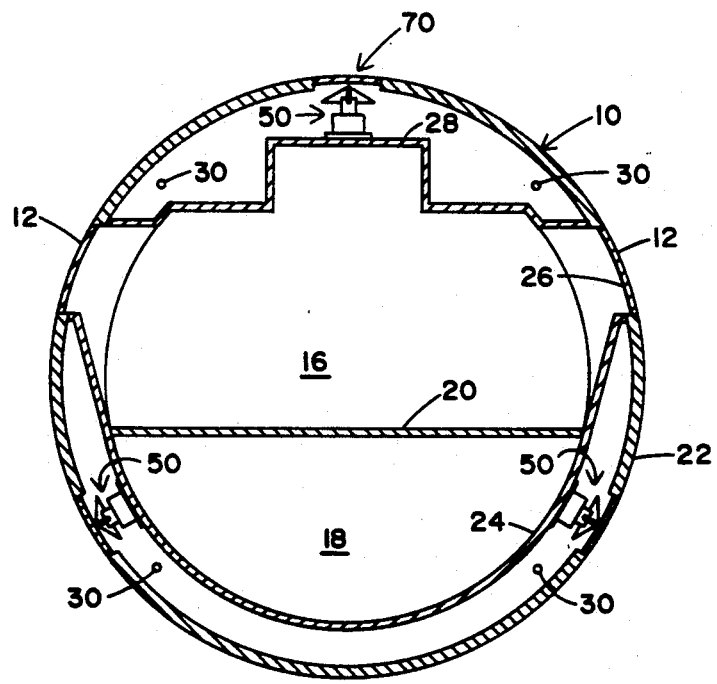
FIG. 2 is a cross section of an aircraft illustrating one arrangement of the fiber optic cables and the active devices in accordance with the present invention.

With reference to FIGS. 1 and 2, the preferred embodiment will be described. This embodiment utilizes a fiber optic cable which extends throughout the body of the craft. In the preferred embodiment, the fiber optic cable is routed in such a manner as to position the cable proximate to doors, windows, hatches, intake and exhaust ports, emergency ports or ramps and the like.

With reference to FIG. 1, a typical aircraft fuselage 10 is shown with a plurality of windows 12 and two doorways 14. The fiber optic cable is routed along the superstructure of the craft between the outer skin and the interior wall which defines the various compartments. The important element in routing the cable 30 is to locate the cable so as to receive fast, accurate information regarding any failure throughout the craft. Since windows and doors are easily identified potential failures, the cable 30 is routed around them.

With reference to FIG. 2, it can be seen that the fiber optic cable 30 runs through all four quadrants of the tube which defines the fuselage 10. As will be recognized by those skilled in the art, the fuselage 10 is comprised of an outer skin 22 and an interior wall 24 which are secured on a superstructure 26. In addition to the superstructure, 26 the aircraft will have additional structure elements which define ceiling structures 28 and floor structures 20. The tube of the aircraft 10 is effectively divided into a passenger compartment 16 and a cargo or baggage area 18.

In the preferred embodiment, the fiber optic cable 30 is a single continuous cable which has been routed throughout the craft. As will be known to those skilled in the art, all transmission lines, whether they are common copper wire or fiber optics, have a characteristics impedance. In high quality lines, such as fiber optics, that impedance is substantially constant throughout the length of the transmission cable. Since the impedance characteristic is essentially constant, any disturbance in the line will result in a corresponding disturbance in the line impedance at a given point or along a reasonably well defined section. These changes in the characteristic impedance of the transmission line result in an impedance surge having a portion thereof reflected back toward the signal source. The reflected signal arrives at a time delay which is approximately equal to twice the propagation time from the signal source to the point of changed impedance.

In applications, such as telephone transmissions, it has been learned that the change in impedance may be used as a means for verifying the integrity of the transmission line. The transmission line is interrogated by driving a signal of a predetermined value through the cable and observing the reflected impedance. Time-domain reflectometry (TDR) addresses this problem and exploits the fact that transmission line faults invariably cause the signal to be reflected back along the line. As noted previously, the reflected signal will arrive at a time which may be calculated based on the length of the cable and the propagation time from the signal source to the point of changed impedance. Measuring this time delay through TDR can localize the position of the fault. Furthermore, measuring the reflected strength and envelope of the signal can identify the severity of the impedance change and often identify the nature and source of the change.

More recently, the use of optical time-domain reflectometry (OTDR), has resulted in specialized test equipment which will automatically interrogate optical fiber transmission links utilizing this time-domain reflectometry based test. Since the fiber optic cable may be interrogated by OTDR test equipment, the cable may be a continuous cable which extends throughout the aircraft. As will be recognized by those skilled in the art continuous, unspliced fiber lengths of over 5 miles or 11 kilometers are common. The desirability of using an unspliced cable will be explained further hereinafter. Since the fiber optic may be interrogated from a single end and the OTDR equipment will register reflected signals due to changed impedance, there is no necessity for terminating the opposite ends of the cables at the test site. Interrogation of the cable will be described hereinafter with reference to FIG. 11.

As can be appreciated by those skilled in the art, the level of sensitivity in the transmission cable, whether it is of wire or fiber optics, suggests that the present system should be powered by on-board clean lines having specified surge controls. Such clean lines are frequently associated with on-board computers. In the preferred application, the system would be powered by a controlled electrical source, preferably dedicated, and would have a back up system of lithium batteries. One of the primary considerations in selecting fiber optic cable over wire cable is the potential for interference with a wire cable from surges, random charges and natural interference, such as electrical storms and/or lightning strikes.

As noted previously, it is preferred that cable 30 be a continuous length without connectors or splices. This preference is based upon an understanding of the dead zone phenomena which occurs when a fiber optic cable is connected. As a result of the interface at the connection, the OTDR test equipment will receive an overload of reflections from the interface. This overloads the detector for a period of time before it can respond to subsequent reflections which may be produced from the actual cable. Generally, the recovery time translates into a length of interrogated fiber for which the OTDR test equipment is essentially blind. As the number of connectors increase, the potential for additional reflections is increased. The dead zones have been recognized as being particularly troublesome because they have a high probability of shadowing a real fault. Since cables, both wire and fiber optic, are available in lengths which eliminate the need for connectors, it is preferred that connectors be avoided in the cable system.

As will be recognized by those skilled in the art, fiber optic transmission lines are sensitive to even a micro bend. Through the use of OTDR test equipment, it is possible to detect the loss of light through a micro bend in a cable. Such techniques have been recognized in the area of secure transmission lines. As a result of this sensitivity of the cable to even a micro bend, it has been determined that the fiber optic cable 30 may be used as a pressure sensing device to interrogate the structural integrity of the aircraft. Since the cable 30 is originally routed in a set pattern and that pattern can be defined in terms of impedance reflection and light loss, any variation in the environment will create a non-specified deviation in the cable impedance and/or light loss. Stated in another way, a failure in the craft integrity will result in a change in the pressure exerted upon the cable. This change in pressure translates into a change in impedance and/or light loss. That change is detected by the OTDR test equipment.

Since the base line information about the craft is available, it is possible to establish the range of changes which are within the normal compensation or recovery capacity of the aircraft or to calculate and determine that a specific change is within that range associated with the normal operation of the craft. Through the use of computers or other signal processing equipment, the information obtained from interrogating the cable can be quickly compared to base line factors for the aircraft. If the variations are within known and accepted ranges, no responsive action is necessary. In the event that the ranges indicate a catastrophic failure, such as the loss of a cabin door, a loss of a portion of the craft's outer skin or another structural failure which has resulted in sudden depressurization, a signal is output to an active device which will respond to and correct the depressurization problem. As will be recognized by those skilled in the art, a sudden depressurization generally creates a draft within the craft tube that results in personnel and property being drawn to and perhaps through the aperture or rupture in this craft integrity.

In the event that the detected change is not of a catastrophic nature requiring an immediate response, the information may be stored in the record and reviewed by the appropriate ground maintenance crew. For instance, an incipient failure of the skin at a certain altitude may foreshadow a potential failure in that area. Through the use of the present system, it is possible to identify the area which should be inspected by a qualified ground maintenance crew member.

With respect to the preferred use of fiber optics, it will be recognized by those skilled in the art that the interrogation can be made in a very rapid fashion. It will also be recognized that the speed of the light within an optical fiber is influenced by the refractive index of the fiber. Accordingly, the speed within the optic fiber will be reduced from the classical speed of light in a vacuum.

Figure 9:
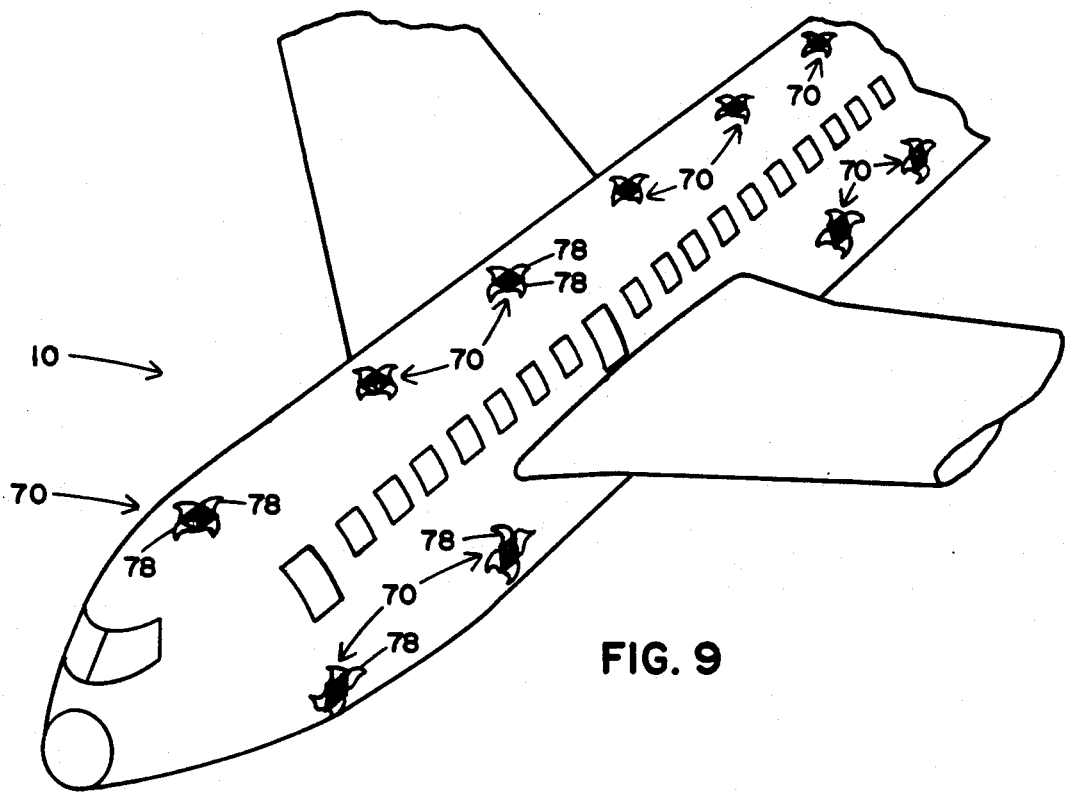
FIG. 9 is an illustrative view of an aircraft having a plurality of ruptured sections.

Returning to FIG. 2, a plurality of active rupture devices 50 are shown spaced about the aircraft. The rupture devices 50 will be placed along the length of the aircraft, in places selected according the aircraft design, and about the radius of the aircraft tube. See FIG. 9. In the illustration of FIG. 2, the rupture devices 50 are generally located at 12, 4 and 8 o'clock. Positioned adjacent each of the rupture devices is a rupture panel 70. The rupture devices 50 and the panels 70 will be described in more detail hereinafter. For the present purpose, it has been determined that sufficient rupture devices 50 and rupture panels 70 should be provided so that the total rupture area throughout the craft would equal approximately the maximum cross sectional area of the tube of the aircraft fuselage 10 as it is shown in FIG. 2.

Figure 3:
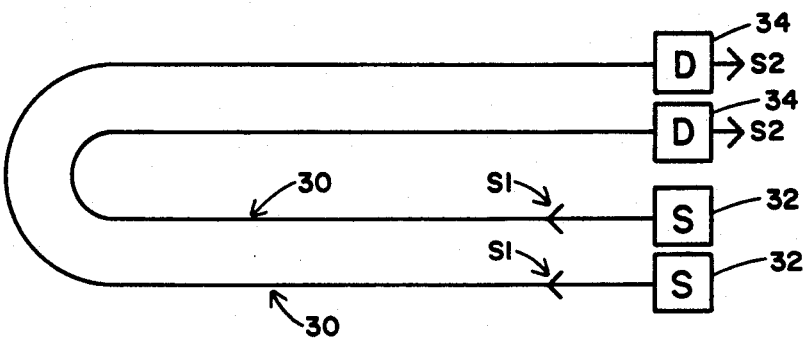
FIG. 3 shows one possible arrangement of fiber optic cables, signal sources and detectors.
Figure 4:
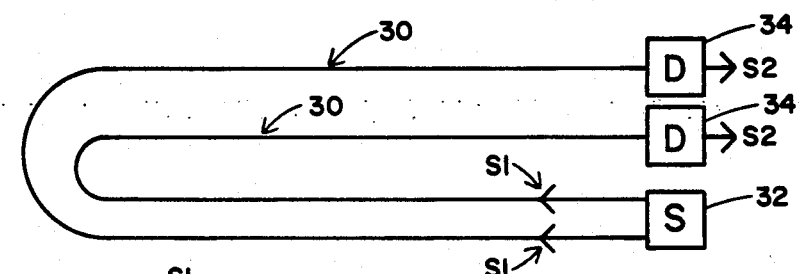
FIG. 4 shows another possible arrangement of fiber optic cables, signal sources and detectors.
Figure 5:
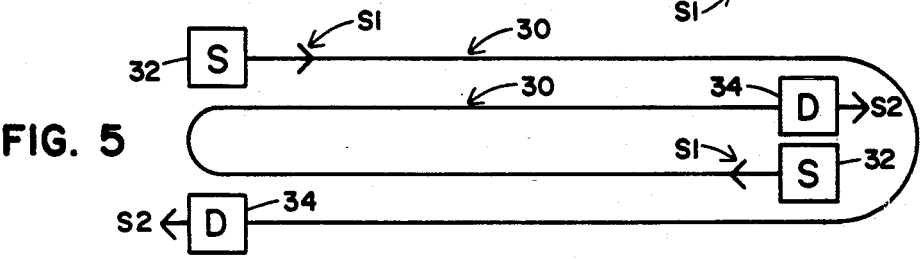
FIG. 5 shows another possible cable arrangement.

With reference to FIGS. 3, 4 and 5, there are shown alternative arrangements for the detection system of the present invention. It is well recognized in the aviation industry that systems should have redundancy. In the embodiment of FIG. 1, a redundant system would independently duplicate the first system. In the embodiment of FIG. 3, two cables 30 are routed throughout the craft and each cable is connected to a separate signal source 32 which outputs a first signal S1 to interrogate the cable 30. In this embodiment, the interrogation signal, rather than merely being reflected upon itself is received by a detector 34 which performs the base line evaluations previously discussed and will output a responsive signal 32. Since the redundant system may be separately routed, it is possible to create different fiber length configurations and different interrogating systems with the dual sources 32. The output signals $S_2$ would be the result of a comparison against the base data and would determine whether or not an active response was required.

In the construction of FIG. 4, there is one signal source 32 which outputs the common value signal $S_1$, which may be a divided signal or two parallel signals. Once again, the length and characteristics of the cable 30 are known. Accordingly, the information received at the detectors 34 is again compared and the $S_2$ signal is generated based upon that comparison.

In the embodiment of FIG. 5, the redundant systems are separated and run in opposite directions. Furthermore, the signal sources are positioned on opposite sides of the enclosed environment so that active interrogation by two systems on opposite portions of the cable loop are being conducted simultaneously. Once again, the interrogation data is compared to base data and will generate an output signal $S_2$.

In all embodiments, the system will have established base line data and that data is constantly compared to the information developed during the repeated polling or interrogation of the system.

Figure 6:
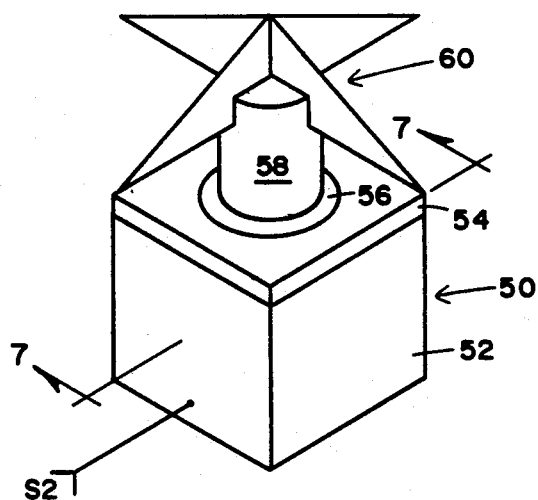
FIG. 6 shows an active piercing device in accordance with the present invention.
Figure 7:
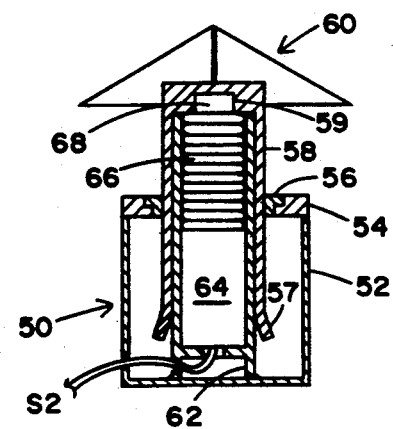
FIG. 7 shows a detailed view of the construction of the device in FIG. 6.

With reference to FIGS. 6 and 7, the active rupture device 50 will be described. Referring first to FIG. 6, the rupture device 50 is generally comprised of a base container 52 which is structurally rigid for securement to the superstructure of the craft, as shown in FIG. 2. The base container 52 is closed by the lid 54. Lid 54 has a center bearing element 56 which surrounds the sleeve 58. Positioned at the free end of sleeve 58 is a rupture element 60. In the preferred embodiment the spear tip or rupture element 60 is comprised of four triangularly shaped blades which generally define a star cutter element.

With reference to FIG. 7, the means for actuating the active rupture device 50 will be described in more detail. Within the base 52, there is a hollow sleeve 62. The hollow sleeve is positioned so as to be on centerline with the interior aperture of the bearing element 56. Positioned within the well of the sleeve 62 is a pyrotechnic device which has a base chamber 64, bellows 66 and the nipple or nose 68. The pyrotechnic device fits snugly within the sleeve 62 and is provided with input leads which extend through a side wall of the sleeve 62 and a side wall of the base 52. The signal $S_2$ is transmitted over the electrical leads. Pyrotechnic devices of the type described are known to produce linear or non-linear motion based upon the rapid expansion of gas. Once such device is available from ICI Aerospace, P.O. Box 819, Valley Forge, Pa. 19482 as Part No. 1MT170, Bellows Actuator. Variations in the stroke length, force, shape of the bellow nose, firing characteristics and environmental resistance are possible. The use of electrically initiated, single-function actuators suitable for use in the present invention have been known to perform functions such as cutting reefing lines. Two such devices are available from ICI as Product Nos. 1SE166 and 1SE167.

In the present invention, it is preferred that active devices such as the bellows actuator described in FIG. 7 be utilized in the present invention. However, it is recognized that the cutter element 60 may be made subject to a fixed load, such as a compressed spring, retained by a retaining line which would be severed by a cutting element such as the reefing line cutter previously identified.

With reference again to FIG. 7, the sleeve 62 is dimensioned to receive the actuator in a snug fit. The outer sleeve 58 is opened at one end thereof and closed at the free end thereof. The sleeve 58 is dimensioned to fit about the sleeve 62 and to be of such a length that full extension of the actuator will not result in the sleeve 58 being dislocated from the sleeve 62. Through the cooperation of sleeve 68 and sleeve 62, it is possible to retain a fixed rigid centerline. The closed end of sleeve 58 has a recess 59 which receives the nipple or nose 68 of the actuator device. The lower or interior end of the sleeve 58 has an outward flange 57. The flange 57 will not limit the stroke of the sleeve 58 based upon operation of the actuator device, however, it will prevent sleeve 58 from being totally dislocated from the actuator 50 and becoming an independent projectile.

Figure 8:
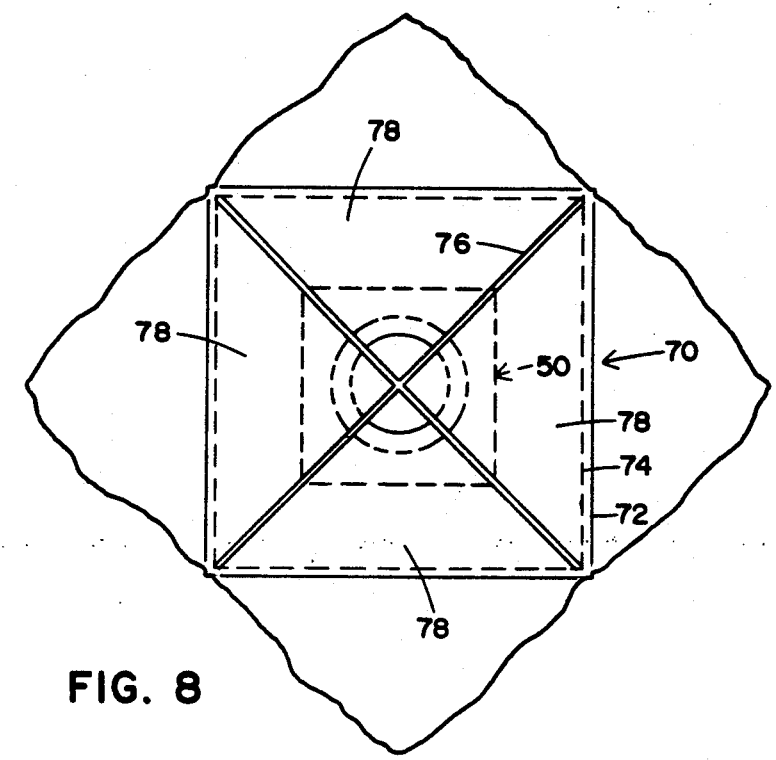
FIG. 8 illustrates the assembly of a rupture panel and the active device of FIG. 6 in accordance with the present invention.

With respect to FIG. 8, there is shown a top plan view of the rupture panel 70 with the rupture device 50 shown in phantom. The rupture panel 70 is preferably of sheet metal of the type normally associated with the skin of the aircraft. The panel is generally rectangular and has a parameter 72 which is mounted on a framing member 74 which extends about the parameter of the panel. The framing member 74 facilitates assembly of the rupture panel member 70 to the aircraft and replacement thereof. Across the surface of the rupture panel 70 in the area enclosed within the frame 74, the rupture panel has preformed shear lines which gene rally define an X pattern 76 across the panel. The shear lines 76 do not extend through the panel and are designed solely for the purpose of controlled rupture. When the actuator device contacts the rupture panel, the cutting element 60 will rupture the panel along the shear lines 76. Due to the combined effect of the rupture device and the outward surge of pressure, the triangular portions 78 of the rupture device will separate from each other and away from the skin of the craft. This will then create an aperture in the skin of the craft having an area substantially equal to that within the parameter frame 74. See FIG. 9 for an illustration of ruptured panels. The shear lines 76 and frame 74 are intended to control the rupture and prevent the loss of sheet material. Alternatively, standard aircraft skin material may be used.

It is anticipated that rupture panels 70 and actuator devices 50 may be designed into new aircraft. However, it is also contemplated that such a device may be advantageously retrofitted to existing aircraft. For ease of assembly and replacement, the frame members 74 is advantageous. However, frame member 74 is also advantageous with respect to the production of a rupture unit which will be described more fully hereinafter with respect to FIG. 12.

Figure 10:
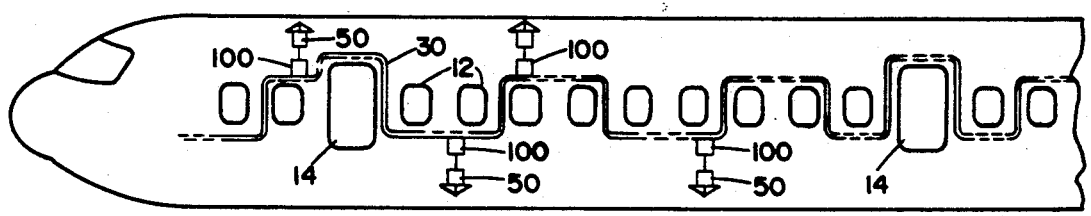
FIG. 10 shows an alternative embodiment of the present invention.

With reference to FIG. 10, there is shown an alternative embodiment of the present invention which utilizes pressure sensing devices. In this embodiment, the transmission line 30 is strung throughout the craft as in the previous embodiment. However, detection of pressure variations or changes is made through the use of pressure sensitive devices 100. Such devices are commercially available. Examples are the HEISE ® Series 620 pressure transducer and the ASHCROFT ® Model K1 Thin Film Pressure Transmitter both available from Dresser Industries of Newtown, Conn. Another example is the line of semiconductors available from Motorola Semiconductor Products Inc. of Phoenix, Ariz. under Model Nos. MPX200 and MPX201. When pressure sensing devices such as device 100 are used, the change in impedance on the transmission line results from a response by the pressure sensor. When localized sensors are used, it is possible to configure the sensor with acceptable variations built in. Accordingly, the sensor will not respond to acceptable variations and will not trigger an active response. In that case where the variation exceeds acceptable tolerance, an action will be called for. Other suitable sensors are available from ICSensors, 1701 McCarthy Blvd., Milpitas, Calif. as Models 80, 81 and 84.

As will be understood by those skilled in the art, present polling techniques permit the testing device to repeatedly poll a position in virtually continuous fashion. This rapid repeated polling will eliminate an unnecessary response due to a defect within the system. In this regard, the redundancy of the system also provides a fail safe check against an accidental positive response.

With reference to FIG. 10, the device 100 may also be used as a signal output to the rupture device 50. Since the cable will continually poll or interrogate the device 100, it can be used to enable the trigger voltage to the pyrotechnic device, see FIG. 7.

Figure 11:
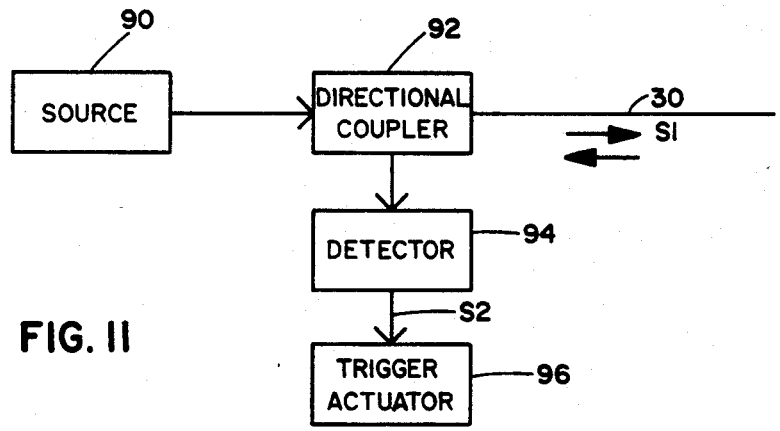
FIG. 11 is a schematic representation of a basic system according to the present invention.

With respect to FIG. 11, it schematically represents the interrogation of the fiber optic system. Such an interrogation system could be used with the single continuous length embodiment described in accordance with FIG. 1. In this configuration, a signal source 90, such as a pulsed laser, outputs a signal $S_1$. The signal $S_1$ passes through a directional coupler 92 and into the transmission line 30. As a result of line interrogation by OTDR test equipment, the reflected signal is returned to the directional coupler which recognizes the returned direction element of the signal and outputs those values to the detector/controller 94. The controller 94 will determine differences and compare those differences to the preset fixed values. When controller 94 has identified a non-system variation which requires an active response, a signal $S_2$ is output to trigger the active response. Trigger actuator 96 may in fact be the active device 50. However, it is preferred that a trigger device be interposed between the controller and the active device 50. The triggering device is primarily intended to avoid the potential for an accidental firing of a pyrotechnic device as a result of a static charge, electrical interference, and/or lightning. Depending on the pyrotechnic device selected, its electrical characteristics and the degree of isolation, the trigger function of element 96 may be eliminated.

Figure 12:
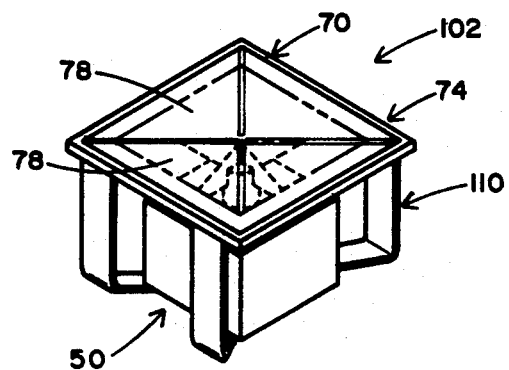
FIG. 12 shows the actuator device and the receptive panel of the invention as an assembly.

With reference to FIG. 12, there is shown an assembly 102 which includes a rupture panel 70 and a rupture mechanism 50. This assembly is particularly intended for retrofit applications where structural members for location of a device may not be readily available. With this in mind, it is anticipated that the parameter frame 74, which secures the rupture panel to the superstructure of the aircraft, will support the rupture device 50. Extending away from the panels 78 and depending from the frame 74 is a rigid frame structure 110 having four depending members which support a center base. Mounted on this center base is the rupture device 50. With this assembly, the attachment of the parameter frame 74, such as by riveting or other methods generally used in aircraft construction, will provide a rigid frame portion which positions the rupture device in the proper predetermined location with reference to the rupture panel 70. This assembly eliminates the possible need to modify the superstructure of the craft in order to install rupture devices and panels in accordance with the present invention.

It will be understood by those skilled in the art that variations in rupture area will be determined by the particular application. In the case of aircraft the rupture panels should be maintained at the minimum size possible so as to avoid structural damage or further damage to structural integrity. Multiple holes will also avoid a reverse rush in the pressurized containment area. Since each single opening will be of a size that is calculated to produce the specified volume of changes and the total openings will be balanced with the size of the containment area, the required balance should be achieved quickly.

In general, it is expected that the total area of the aperture(s) as a result of the response to an event will be large enough to prevent propagation of the rush and/or wave front caused by the failure. Likewise, the location of the aperture(s) will be such as to provide a rapid balancing response.

In the preferred signalling arrangement, a first signal (i.e. 1350 nanometers) is utilized for polling and a second signal (i.e. 1550 nanometers) is utilized for actuating the rupture device. Thus, the separation of the signals is by frequency division.

I claim:

1. A system for controlling the ambient pressure within an aircraft cabin, said system comprised of:
    means for directly sensing a failure of the structural integrity of the aircraft cabin wherein said means comprises:
        a signal transmission means dispersed throughout the cabin;
        a means for inputting a first signal into said signal transmission means; and
        a means for sensing a change in the signal transmission means by determining the relative change in the said first signal over time and outputting a second signal based upon a determination of a change in the signal transmission means;
    said system further comprises:
        an actuation means for receiving said second signal and instantaneously altering the ambient cabin pressure in response to the value of the second signal through selected rupture of the aircrafts fuselage to the outside atmosphere.

* * * * *